(12) United States Patent
Marqvardsen et al.

(10) Patent No.: US 6,922,471 B1
(45) Date of Patent: Jul. 26, 2005

(54) COMMUNICATION DEVICE WITH SHARED INTERIOR RESONANCE CHAMBERS

(75) Inventors: Ion Marqvardsen, Aalborg (DK); Bjarne Hagbart Bjerre, Støvring (DK)

(73) Assignee: Sony Ericsson Mobile Communications AB (SE)

( * ) Notice: Subject to any disclaimer, the term of this patent is extended or adjusted under 35 U.S.C. 154(b) by 0 days.

(21) Appl. No.: 09/868,702

(22) PCT Filed: Dec. 20, 1999

(86) PCT No.: PCT/DK99/00719
§ 371 (c)(1),
(2), (4) Date: Sep. 24, 2001

(87) PCT Pub. No.: WO00/38475
PCT Pub. Date: Jun. 29, 2000

(30) Foreign Application Priority Data

Dec. 21, 1998 (DK) .......................................... 1998 01700

(51) Int. Cl.⁷ ................................................ H04M 1/00
(52) U.S. Cl. .................................................. 379/433.02
(58) Field of Search ....................... 379/433.02, 433.01; 455/90.3, 575.5, 575.7; 343/702

(56) References Cited

U.S. PATENT DOCUMENTS 5,953,414 A * 9/1999 Abraham et al. ...... 379/433.02
6,304,222 B1 * 10/2001 Smith et al. ................ 343/702

* cited by examiner

Primary Examiner—Jack Chiang
(74) Attorney, Agent, or Firm—Cantor Colburn LLP (57) ABSTRACT

The invention relates to a communication device comprising a housing enclosing at least one loudspeaker and at least part of at least one antenna inside the housing. This at least one loudspeaker comprises an acoustic resonance chamber while said at least one antenna comprises at least one electromagnetic resonance chamber. The invention teaches that the acoustic resonance chamber can be located completely or partly within the electromagnetic resonance chamber.

26 Claims, 7 Drawing Sheets

COMMUNICATION DEVICE WITH SHARED INTERIOR RESONANCE CHAMBERS

This application is a 371 of PCT/DK99/00719 filed Dec. 20, 1999.

The invention relates to a communication device comprising a housing enclosing at least one loudspeaker and at least a part of at least one antenna inside the housing, said at least one loudspeaker comprising an acoustic resonance chamber and said at least one antenna comprising at least one electromagnetic resonance chamber.

BACKGROUND OF THE INVENTION

Communication devices, such as handheld cellular phones, have gained widespread acceptance over the years. One reason for this is the constant development of new generations of communication devices of smaller dimensions than the previous ones making the communication device handier in use and more convenient to carry.

In the field of this invention, a conventional communication device comprises two volumes of interior space used as resonance chambers where the loudspeaker uses the first volume and the antenna uses the other volume.

A problem with the conventional communication device is to make it yet even smaller or at least maintain the size even though the communication device has to contain an ever increasing amount of electronic components to be able to offer new features.

SUMMARY OF THE INVENTION

When, as stated in claim 1, the acoustic resonance chamber is completely or partly located within the electromagnetic resonance chamber, it is possible to manufacture considerably smaller communication devices than the conventional types with separate resonance chambers for the antenna and the loudspeaker.

At the same time, volume needed for walls to encapsulate two resonance chambers can now be reduced to walls surrounding the shared resonance chamber.

It should be noted that an acoustic resonance chamber according to the invention may e.g. be a closed pressure chamber or a partly closed bass reflection chamber adapted to obtain desired frequency characteristics and efficiency. The main component providing this feature in a pressure chamber loudspeaker is the air encapsulated by the walls defining the chamber and the membrane. The encapsulated air will accordingly act as an elasticity, defined within the art as $c_m$. Of course, a resonance chamber according to the invention can also comprise a bass reflection design in which especially the lower frequency of the loudspeaker system is modified by the adding of at least one opening from the internal of the loudspeaker chamber to the external.

The purpose of an acoustic resonance chamber is well described within the art of loudspeakers.

It should moreover be noted that an electromagnetic resonance chamber according to the invention is defined as at least part of the volume between at least a radiant part of an antenna and a ground plane or reference of said antenna. The said electromagnetic resonance volume has a specific dielectric constant and is arranged within the housing of the device.

It is understood that the electromagnetic resonance volume may comprise air or a combination of air and a dielectric material.

The meaning of an electromagnetic resonance chamber is well described within the art of antennas.

According to the teaching of the invention, the above resonance may be shared more or less extensively as the two different resonance phenomena may be established independently of each other. No interference or distortion will occur as the low frequency acoustic pressure wave resonance will be of a completely different nature than the electromagnetic resonance within the antenna resonance chamber.

Another important feature of the invention is that the desired electromagnetic performance of the antenna resonance chamber may be established fully or partly in air as the dielectric properties of air may fully satisfy the desired dielectric properties between e.g. the radiant plane and the ground plane of a patch antenna. Moreover, the desired conditions may be obtained by a combination of a solid dielectric and a gas dielectric, i.e. air. This possibility of designing a dielectric resonance chamber as a combination of air and solid dielectric, or completely by air, results in a significantly increased freedom when designing the device. A solid dielectric according to the invention may e.g. be different kinds of plastics known within the art.

Due to the nature of the acoustic resonance chamber, the design of the internal shape of the chamber is of very little importance.

The communication device of the invention is preferably a mobile communication device or a handheld cellular phone.

Thus, according to the invention, the electromagnetic and the acoustic resonance chambers share a certain amount of air, having both the desired acoustic and dielectric properties.

Consequently, a reduction of weight and of course material expenses is obtained as the dielectric used to fill the volume inside the antenna may now be replaced by air.

When, as stated in claim 2, at least one antenna is a directive patch antenna, it is possible to control the direction of the radio waves from the antenna.

It should be noted that a directional patch antenna requires a relatively high resonance volume, i.e. resonance volume between the radiant part of the antenna and the ground plane, in order to obtain a satisfactory bandwidth. The possibility of establishing a shared volume between the acoustic resonance chamber and the electromagnetic resonance space of the antenna provides the possibility of obtaining a significant reduction in volume. It should be noted that even an apparently minor reduction in volume of a communication device may be significant when an effective reduction in volume of e.g. 1 to 5 $cm^3$ is obtained in a 100 $cm^3$ mobile phone.

When, as stated in claim 3, at least one antenna is a dual-band antenna, it is possible to reduce the even stricter design criteria as the resonance volume will tend to occupy even more of the volume of the device.

When, as stated in claim 4, at least one antenna completely or partly defines the walls of the acoustic resonance chamber, it is possible to use the antenna for its main purpose while also letting it constitute part of the walls of the resonance chamber.

The antenna components such as ground plane and radiant plane may be supported by a great variety of chamber designs as the volume required for the acoustic resonance chamber will usually be significantly less than the required volume of e.g. a micro-strip antenna.

Of course, it should be kept in mind that the chamber defining materials, except for the active antenna planes, should have a dielectric constant being somewhat comparable with the air inside the chamber. At least, it should be designed in such a manner that the overall obtained dielectric properties meet the desired requirements.

When, as stated in claim 5, the loudspeaker is coupled with the acoustic resonance chamber by at least one acoustic channel, a further advantageous embodiment of the invention has been obtained.

When, as stated in claim 6, at least one antenna is a coil or loop antenna, preferably a directive coil or loop antenna, a further advantageous embodiment of the invention has been obtained.

When, as stated in claim 7, the acoustic resonance chamber is a pressure chamber, it is possible to let the loudspeaker use the air located within the acoustic resonance volume as an elasticity, thus obtaining better control over the loudspeaker. This provides a higher quality of the voice reproduction.

When, as stated in claim 8, the acoustic resonance chamber has acoustic openings to the exterior of the chamber, it is possible to make a bass reflex system which has a lower resonance frequency. This means that the system has the ability to expand the frequency range downward with a higher quality of the voice reproduction. At the same time it is possible to eliminate or reduce spikes or peaks in the loudspeaker's frequency response with acoustic openings to the exterior.

When, as stated in claim 9, the dimension of the acoustic resonance chamber, which is completely or partly located within the electromagnetic resonance chamber, is 0.5 to 8 cm3, a further advantageous embodiment of the invention has been achieved.

According to the above-mentioned embodiment, which typically characterises a cellular phone, even minor reductions in volume are important and significant, as the designers of those articles are heavily restricted by the requirement to reduce volume to an "absolute" minimum.

However, it should be noted that the obtained reduction in volume in some devices may of course be much greater within the scope of the invention, if the devices are e.g. fitted with more powerful loudspeakers. In case of an acoustic resonance chamber being of greater volume, an embodiment of the invention will benefit even more from the fact that there are very few constraints, if any, on the design of the resonance chamber.

When, as stated in claim 10, the shared resonance chamber on the inside is reinforced by reinforcement elements or walls dividing the chamber into smaller volumes, it is possible to avoid problems with oscillations in the walls, defining the chamber by using reinforcement elements.

When, as stated in claim 11, the acoustic resonance chamber is completely or partly located within the electromagnetic resonance chamber, wherein said loudspeaker and said acoustic resonance chamber are separated by means of at least one electromagnetic screen, said loudspeaker and said acoustic resonance chamber are acoustically connected through said electromagnetic screen by means of at least one acoustically coupling means, a screening against the electromagnetic fields radiating in a given direction is obtained. The direction will be from the antenna and toward the loudspeaker and the user's head. Since radiation in this direction gives no or only a weak connection to a receiving antenna due to the user being between the antennas, the efficiency of the antennas will be increased with a screen.

When, as stated in claim 12, said screen is the ground plane of the antenna, it is possible to use the characteristics of a directive antenna such as a directive patch antenna in an advantageous manner.

The loudspeaker is coupled with the acoustic resonance chamber by means of at least one acoustic channel passing through said screen, it is possible to dimension the properties, e.g. length, height, diameter or shape, of an acoustic coupling between the loudspeaker and the acoustic resonance chamber in an advantageous manner. This is due to the fact that the acoustic characteristics of the acoustic channel are defined by arbitrary choices instead of the surrounding components of the acoustic coupling providing the designer of the communication device with an active tool when defining the acoustic characteristics of the device.

When, as stated in claim 14, the channel consists of one or more holes in said screen, it is possible to direct the acoustic coupling to the acoustic resonance chamber over the generally shortest possible distance.

When, as stated in claim 15, the number of holes is between 1 and 50, preferably 4 holes, it is possible to maintain the electromagnetic screening effect by using more holes in the electromagnetic screen but with a smaller diameter. By using more holes, it is also possible to maintain the electromagnetic screening effect by placing the holes in different patterns or no patterns at all.

At the same time, the quality of the acoustic characteristics is not decreased since the total area of holes can be kept unchanged while featuring more holes placed in an acoustically advantageous manner in relation to the acoustic resonance chamber.

When, as stated in claim 16, the diameter of the one or more holes are between 0,5 and 10 mm, preferably 2 mm, it is possible to obtain a further advantageous embodiment of the invention.

When, as stated in claim 18, the acoustic resonance chamber is completely or partly located within the electromagnetic resonance chamber and that the loudspeaker and the acoustic resonance chamber are connected by at least one acoustic coupling means, a multiplicity of opportunities of arranging the loudspeaker inside the housing of the communication device is obtained.

This facilitates a somewhat easier design process of the communication device, which is essential because of the very notable restrictions in regard to the size of the communication device.

Moreover, the fact that the shape of the resonance chamber of a loudspeaker is of very little importance with respect to the desired acoustic performance has more or less been fully exploited.

The acoustic coupling means consists of at least one acoustic channel, it is possible to define the acoustic values of acoustic coupling more precisely. This is, of course, also, subject to certain limitations associated with the use of acoustic channels e.g. length, diameter and shape of the channel. These limitations are well described within the art of acoustics and more specifically in the design of acoustic channels.

BRIEF DESCRIPTION OF THE DRAWINGS

The above and other objects, features and advantages of the present invention will become more apparent from the detailed description and the accompanying drawings in which.

DESCRIPTION OF THE INVENTION

Figure 1:
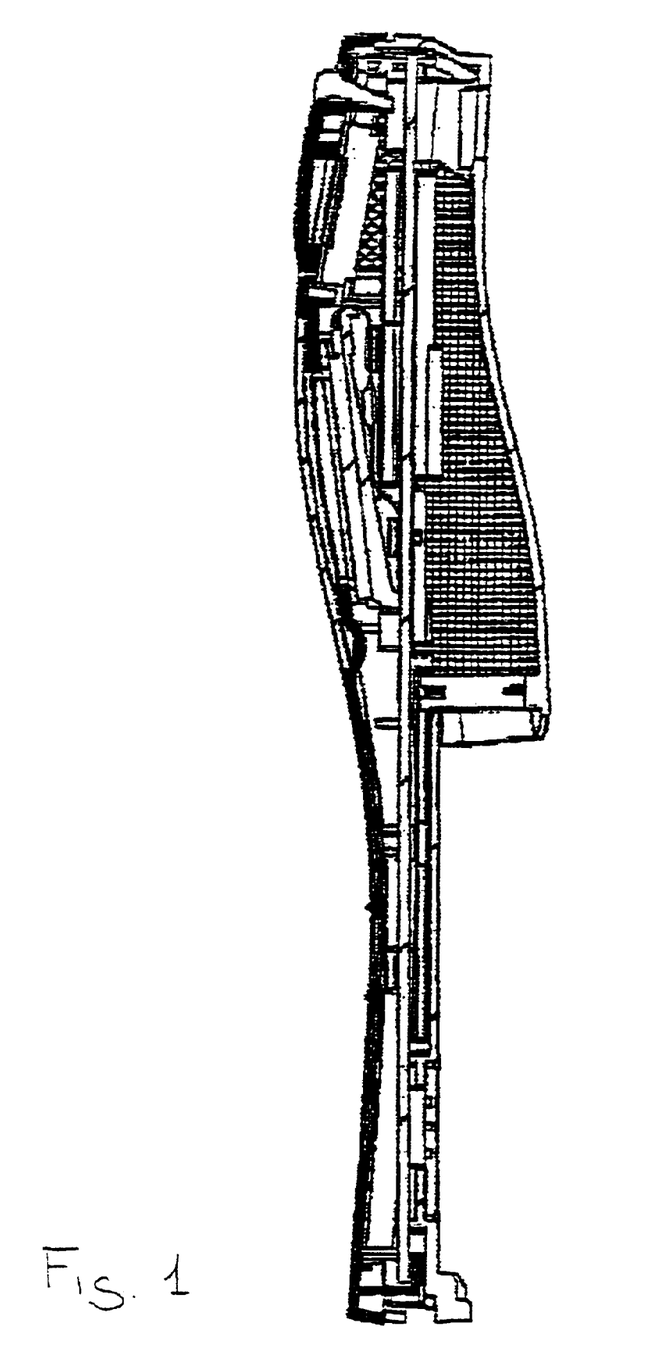
FIG. 1 is a cross section of a conventional communication device with two separate resonance chambers.

Referring to FIG. 1, a conventional communication device comprises a housing 8 containing various structural elements, including the necessary elements of a cellular phone such as a display 3, a keyboard 4, a battery (not displayed in FIG. 1), a microphone, an antenna 1 and a loudspeaker 2. The elements are mounted on or connected to a printed circuit board (PCB) on which other necessary electronic components are mounted.

The communication device also comprises two volumes used as resonance chambers where the loudspeaker uses a first volume and the antenna uses a second volume. The chambers are separated by the PCB which extends in the entire length of the housing.

The resonance chamber is necessary for the loudspeaker because the front side of the loudspeaker membrane has to be somewhat isolated from the backside of the membrane to avoid acoustic short-circuiting between the sides of the membrane. The volume inside the resonance chamber determines the lowest possible frequency to be reproduced by the loudspeaker. It also determines the amount of power necessary to obtain a desired sound intensity.

The resonance chamber is necessary for the antenna because it requires a dielectric volume to radiate the radio waves from the active part of the antenna and down to a ground plane.

The distance between the active part of the antenna and the ground plane is at the same time a measurement of the efficiency of the antenna, meaning the greater the distance the higher efficiency up to a certain limit.

Figure 2:
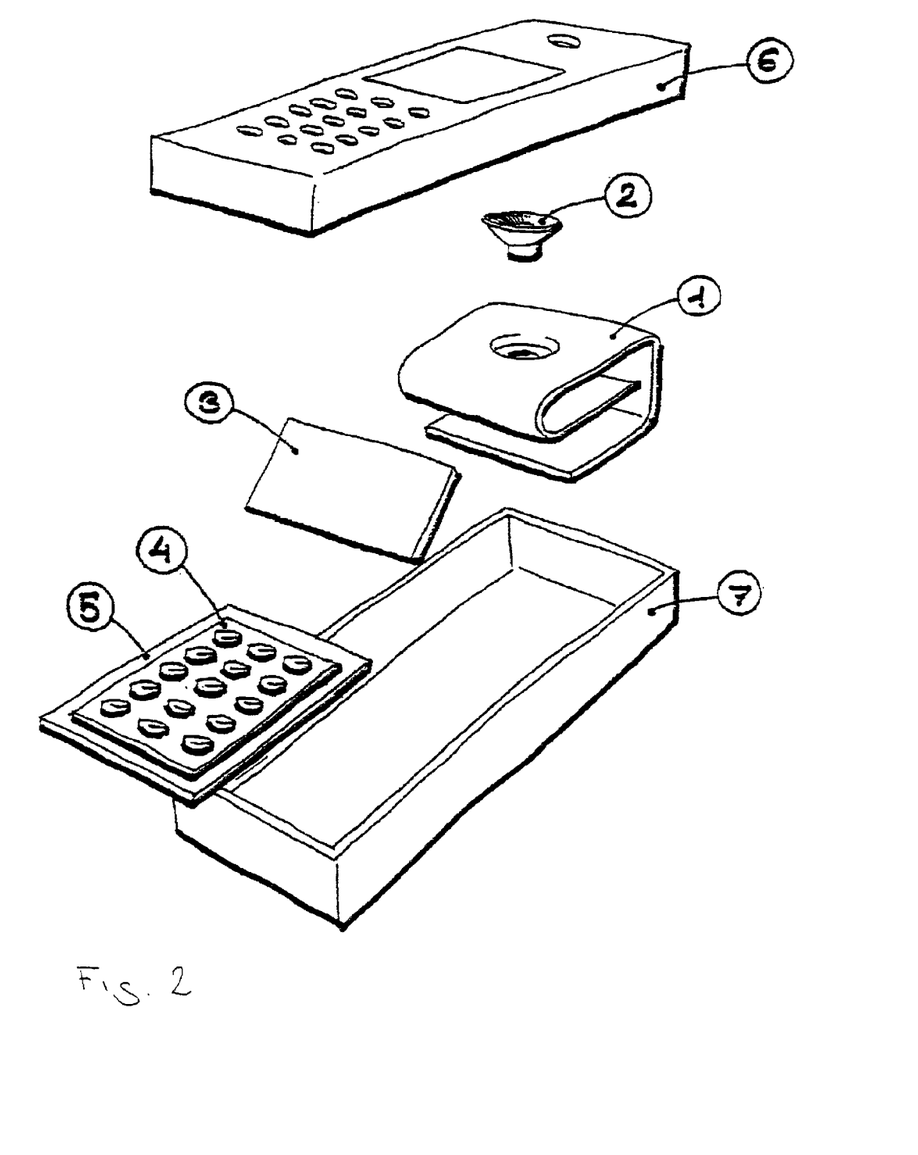
FIG. 2 is a perspective view of a communication device according to the invention.

Now referring to FIG. 2, a communication device according to the invention is displayed. The volume used by the antenna is at same time completely or partly defined by the antenna plane, which acts as walls for the chamber.

The loudspeaker is mounted in an opening in this plane of the antenna and has a direct connection with the volume defined by the antenna.

An antenna of the kind used in the embodiment of the invention has a relatively large volume requirement. To obtain a satisfactory performance by the antenna, the volume has to be in excess of e.g. 13 cm3. Moreover, the loudspeaker requires a certain volume and preferably in excess of 4 cm3. The upper volume limit is determined by the size of the housing and is usually not in excess of 50 cm3 inside the housing which can be utilised as the antenna volume and loudspeaker resonance chamber.

The antenna 1 may preferably be a patch antenna. A dual band patch antenna would be another example of an application within the scope of the invention.

However, it should be noted that according to a further embodiment of the invention, the antenna means may comprise a conventional helix antenna mounted within the housing of the communication device.

Other examples of antennas that may be arranged within the housing of the device are coil and loop antennas.

It is understood that the shape and size of the resonance chamber can be altered from the shape and size displayed in FIG. 2. The only thing that restricts the shape and size of the resonance chamber is the housing in which it is incorporated.

Figure 3:
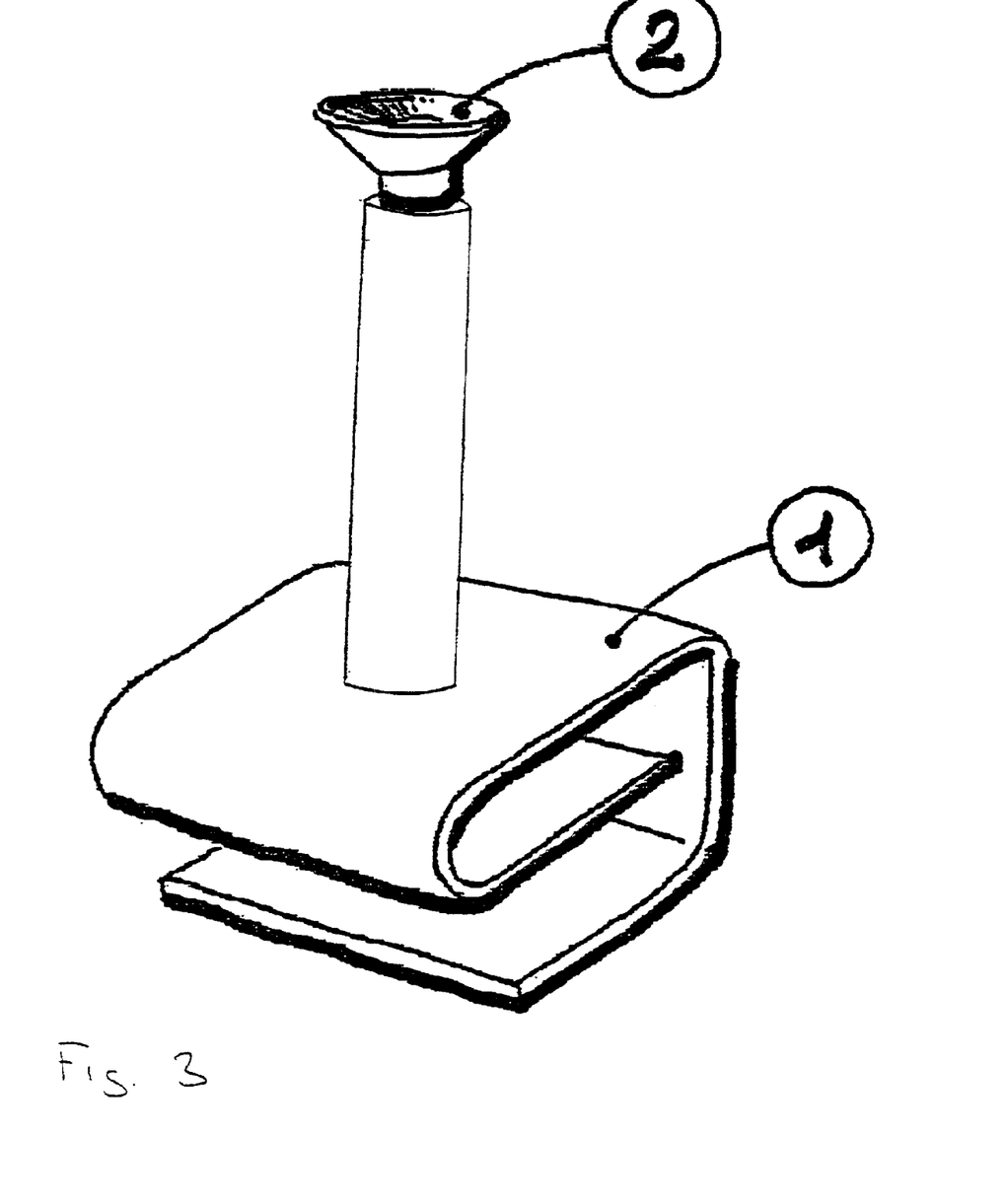
FIG. 3 is a view of a preferred embodiment of the connection between the loudspeaker and the resonance chamber.

In FIG. 3, a preferred embodiment of the invention is displayed. To allow the loudspeaker 2 to be placed in other positions than those which are in direct contact with the resonance chamber, an acoustic coupling 10 is inserted between the loudspeaker 2 and the acoustic resonance chamber 9.

It is understood that the shape and size of the acoustic coupling 10 and the acoustic resonance chamber 9 can be altered from the shape and size displayed in FIG. 3.

Figure 4:
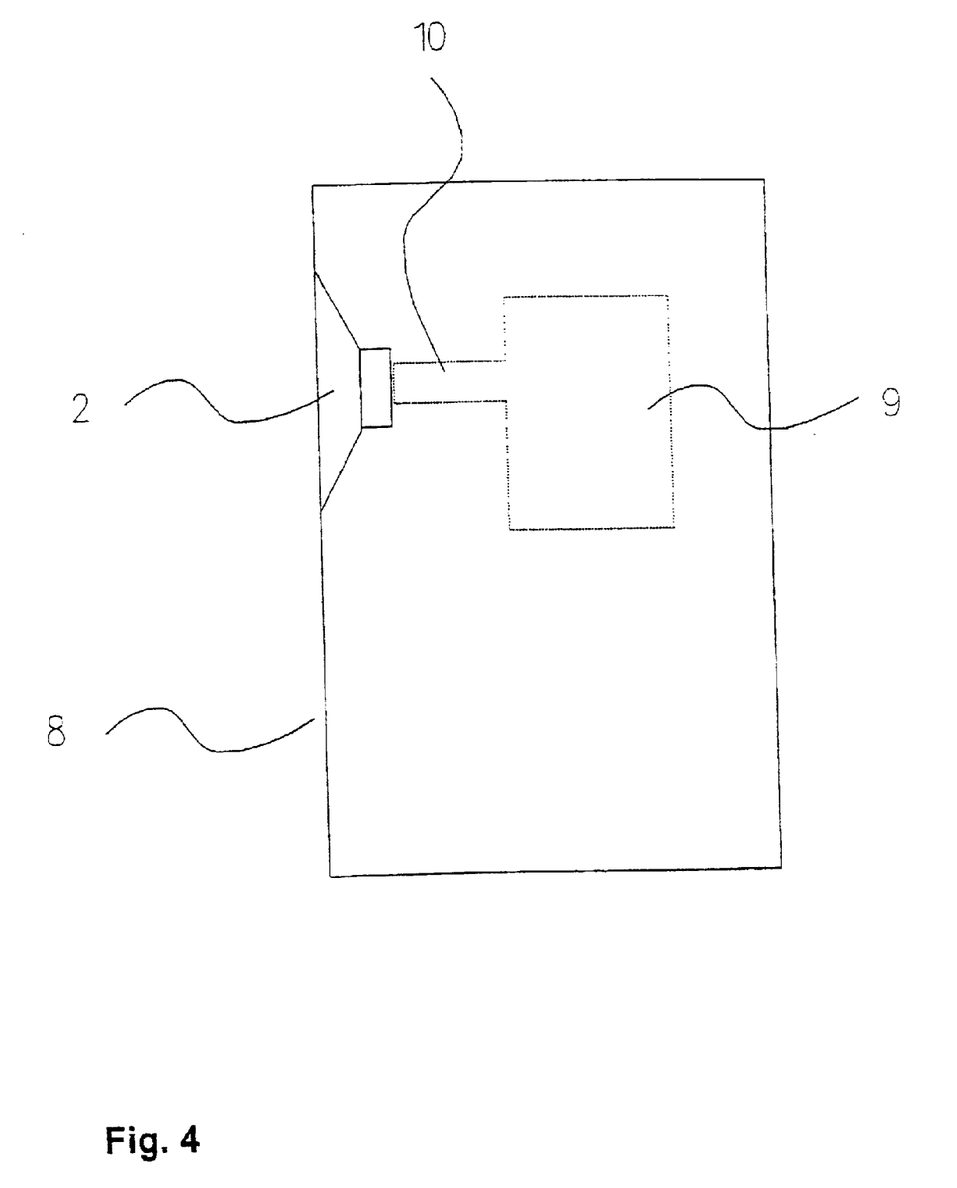
FIG. 4 is a schematic view of the connection between the loudspeaker and the acoustic resonance chamber.

In FIG. 4, schematic illustration of the invention is displayed. The loudspeaker 2 and the acoustic resonance chamber 9 are placed separately inside the housing 8 and coupled together with an acoustic coupling 10.

Figure 5:
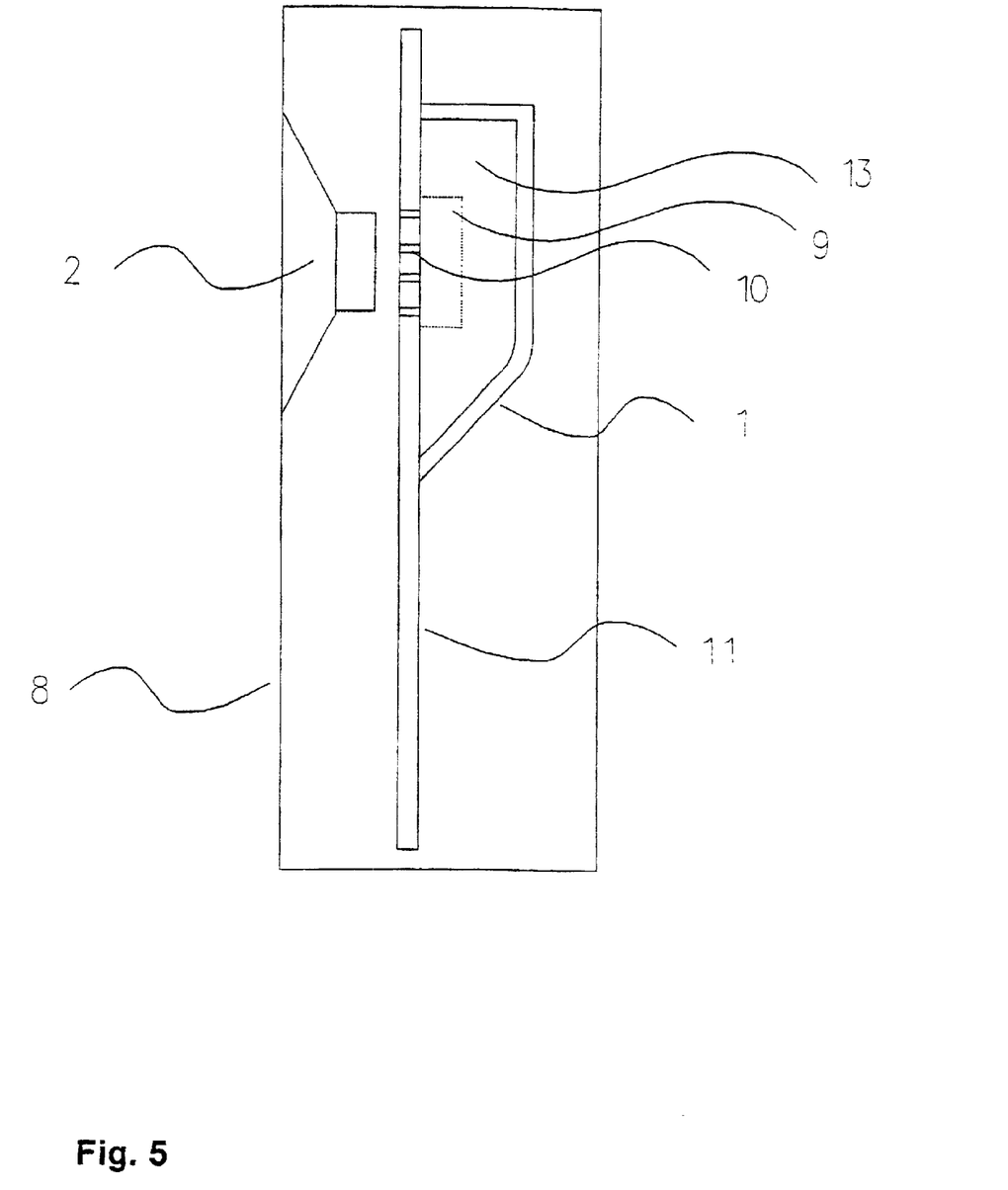
FIG. 5 is a cross view of another preferred embodiment of the connection between the loudspeaker and the acoustic resonance chamber.

In FIG. 5, a detailed embodiment of the invention is illustrated. It shows the loudspeaker 2 and the acoustic resonance chamber 9 being placed separately inside the housing 8 and coupled together with an acoustic coupling 10. The acoustic resonance chamber 9 is located inside the electromagnetic resonance chamber 13 of the antenna 1.

A ground plane 11 separates the loudspeaker 2 and the resonance chamber 9. To establish an acoustic coupling 10 between the loudspeaker and resonance chamber, one or more holes or openings are created in the ground plane 11. The diameter of the holes will normally be between 0,5 and 5 mm, preferably 2 mm, and the number of holes between 1 and 50, preferably 4.

Figure 6:
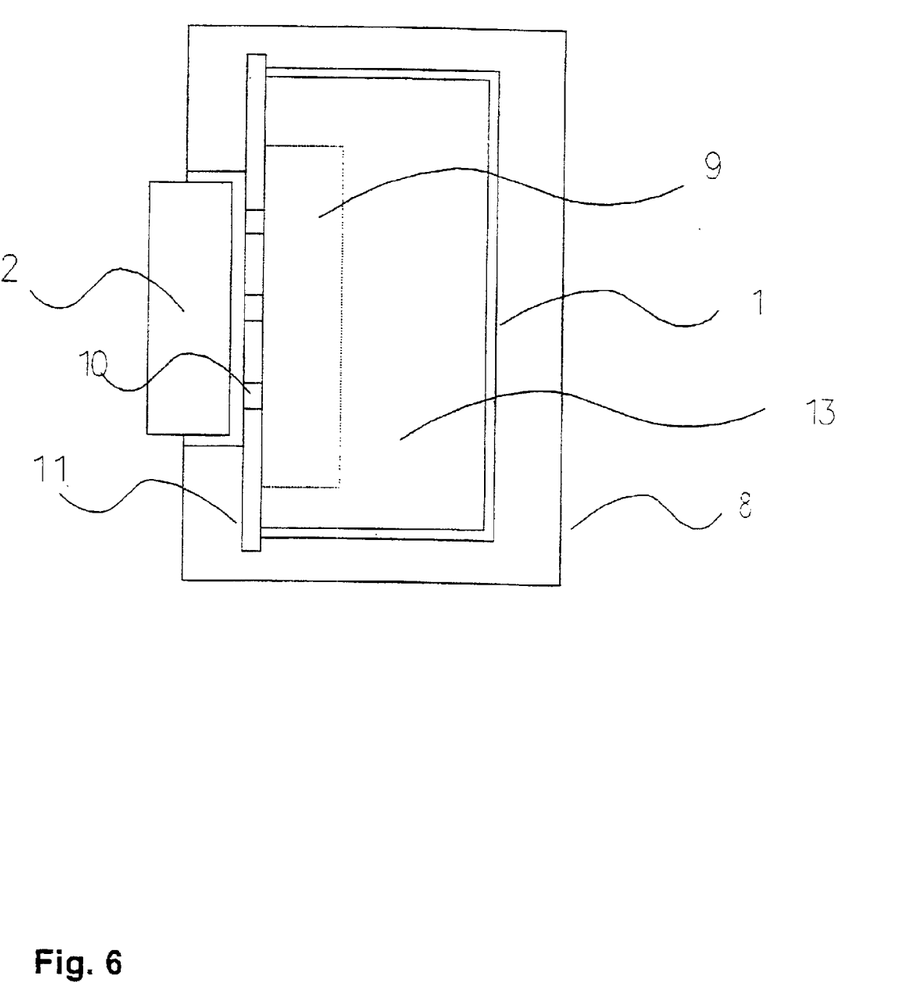
FIG. 6 is a cross section of the communication device seen from above.

FIG. 6 shows a cross section of the communication device seen from above. The loudspeaker, or transducer 2, is placed at a distance from the acoustic resonance chamber 9 and with the ground plane 11 acting as a screen for electromagnetic fields between the two. The ground plane 11 has a number of holes functioning as an acoustic coupling 10 between the loudspeaker 2 and the acoustic resonance chamber 9.

Figure 7:
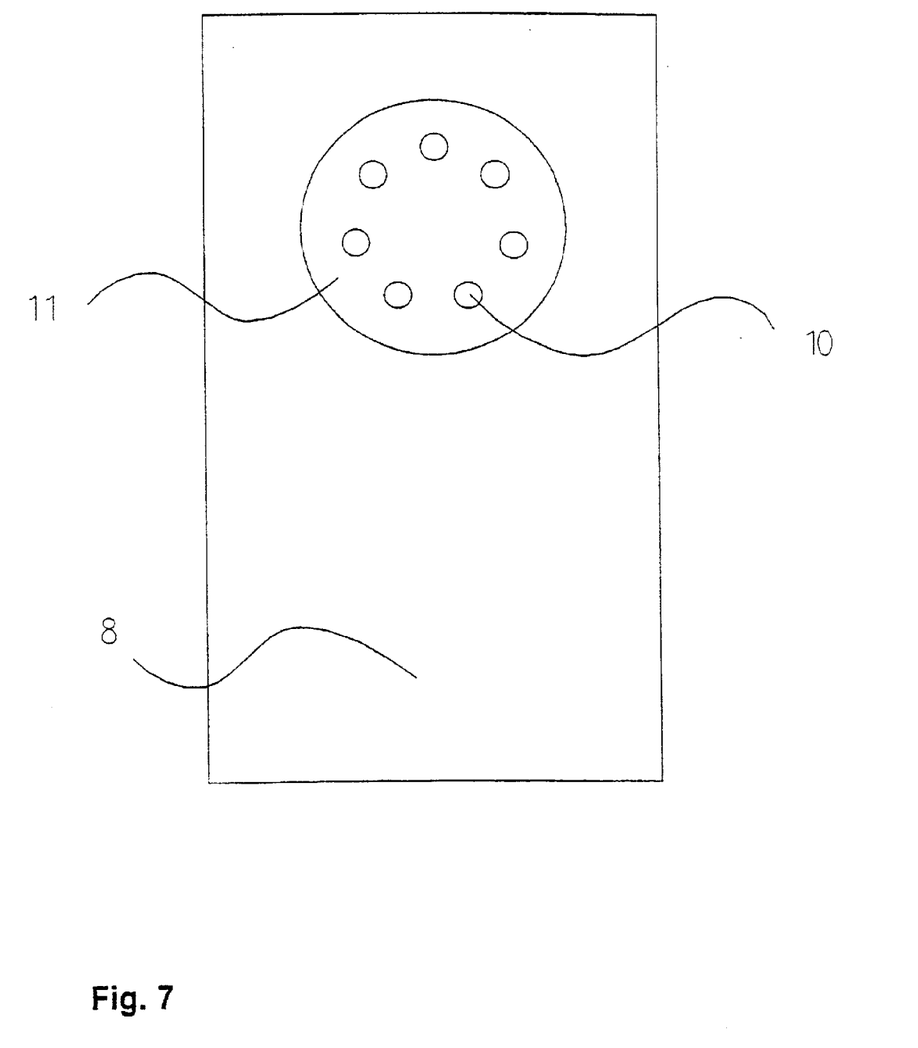
FIG. 7 is a front view of the housing without the loudspeaker in place.

FIG. 7 shows the front of the housing 8 of the communication device. The loudspeaker, or transducer 2, has been removed and the acoustic coupling 10 and the ground plane 11 can be seen.

The acoustic coupling can also be one or more channels where the sides are defined by the surrounding components or it can be one or more tubes, pipes or holes. Also it can be combination of the two.

The screen against electromagnetic fields can be the ground plane of the antenna but also a separate screen whose only purpose is screening. Alternatively, it can be a ground plane to be connected with other parts of the communication device.

LIST

1. Antenna
2. Loudspeaker
3. Display
4. Keyboard
5. Circuit board
6. Upper part of housing
7. Lower part of housing
8. Housing
9. Acoustic resonance chamber
10. Acoustic coupling means
11. Ground plane 12. Acoustic channel or part of an acoustic channel
13. Electromagnetic resonance chamber

What is claimed is:

1. Communication device, comprising:
    a housing enclosing at least one loudspeaker and at least part of at least one antenna inside the housing,
    said at least one loudspeaker comprising an acoustic resonance chamber delimited by an acoustic resonance chamber wall and
    said at least one antenna comprising at least one electromagnetic resonance chamber delimited by an electromagnetic resonance chamber wall,
    wherein the acoustic resonance chamber is completely or partly located within the electromagnetic resonance chamber such that said acoustic resonance chamber wall is disposed, at least partly, within the electromagnetic resonance chamber.

2. Communication device according to claim 1, wherein the at least one antenna is a directive patch antenna.

3. Communication device according to claim 1, wherein the at least one antenna is a dual band antenna.

4. Communication device according to claim 1, wherein the at least one antenna defines the acoustic resonance chamber wall completely or partly.

5. Communication device according to claim 1, wherein the loudspeaker is coupled with the resonance chamber by means of at least one unimpeded acoustic channel.

6. Communication device according to claim 1, wherein the at least one antenna is a coil or loop antenna.

7. Communication device according to claim 1, wherein the acoustic resonance chamber is a pressure chamber.

8. Communication device according to claim 1, wherein the acoustic resonance chamber has acoustic openings to an exterior.

9. Communication device according to claim 1, wherein a dimension of the acoustic resonance chamber completely or partly located within the electromagnetic resonance chamber is 0.5 to 8 cm3.

10. Communication device according to claim 1, wherein the shared resonance chamber is on an inside reinforced by reinforcement elements or walls dividing the chamber into smaller volumes.

11. Communication device, comprising:
    a housing enclosing at least one loudspeaker and at least a part of at least one antenna inside the housing,
    said at least one loudspeaker comprising an acoustic resonance chamber for resonating a sound emitted by the loudspeaker, and
    said at least one antenna comprising at least one electromagnetic resonance chamber,
    wherein the acoustic resonance chamber is completely or partly located within the electromagnetic resonance chamber,
    wherein said loudspeaker and said acoustic resonance chamber are separated by means of at least one electromagnetic screen, said loudspeaker and said acoustic resonance chamber are acoustically connected through said electromagnetic screen by means of at least one unimpeded acoustic channel passing through the screen.

12. Communication device according to claim 11, wherein said screen is a ground plane of the antenna.

13. Communication device according to claim 11, wherein the channel comprises one or more holes in said screen.

14. Communication device according to claim 13, wherein a number of holes is between 1 and 50.

15. Communication device according to claim 14, wherein a diameter of the one or more holes is between 0.5 and 5 mm.

16. Communication device, comprising:
    a housing enclosing at least one loudspeaker and at least a part of at least one antenna inside the housing,
    said at least one loudspeaker comprising an acoustic resonance chamber for resonating a sound emitted by the loudspeaker, and
    said at least one antenna comprising at least one electromagnetic resonance chamber,
    wherein the acoustic resonance chamber is completely or partly located within the electromagnetic resonance chamber, and the acoustic resonance chamber or at least a main part of the acoustic resonance chamber is located at a distance from said loudspeaker and is coupled thereto by at least one unimpeded acoustic channel.

17. Communication device, comprising:
    a housing enclosing at least one loudspeaker and at least part of at least one antenna inside the housing,
    said at least one loudspeaker comprising an acoustic resonance chamber for resonating a sound emitted by the loudspeaker, and
    said at least one antenna comprising at least one electromagnetic resonance chamber,
    wherein the acoustic resonance chamber is completely or partly located within the electromagnetic resonance chamber and the loudspeaker and the acoustic resonance chamber are connected by at least one unimpeded acoustic channel.

18. Communication device according to claim 6, wherein the coil or loop antenna is a directive coil or loop antenna.

19. Communication device according to claim 14, wherein the number of holes is 4.

20. Communication device according to claim 15, wherein the diameter of the one of more holes is 2 mm.

21. A communication device according to claim 1, wherein the electromagnetic resonance chamber is designed as a combination of a gaseous dielectric and a solid dielectric.

22. A communication device according to claim 21, wherein said gaseous dielectric is air.

23. A communication device according to claim 21, wherein the electromagnetic resonance chamber and the acoustic resonance chamber share an amount of said dielectric.

24. A communication device according to claim 11, wherein the electromagnetic resonance chamber is designed as a combination of a gaseous dielectric and a solid dielectric.

25. A communication device according to claim 24, wherein said gaseous dielectric is air.

26. A communication device according to claim 24, wherein the electromagnetic resonance chamber and the acoustic resonance chamber share an amount of said dielectric.

* * * * *